Nov. 8, 1960      H. T. STEVINSON      2,959,671
CRASH POSITION INDICATOR FOR AIRCRAFT
Filed March 26, 1957      7 Sheets-Sheet 1
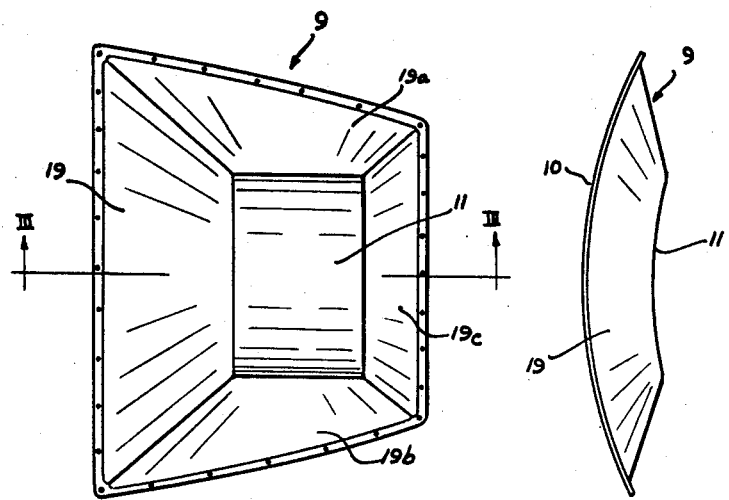
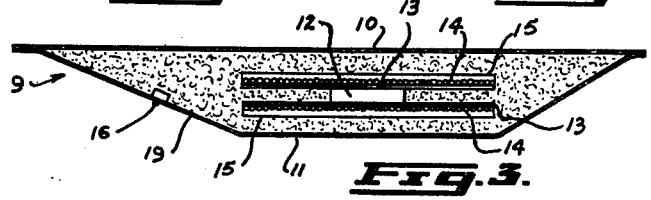
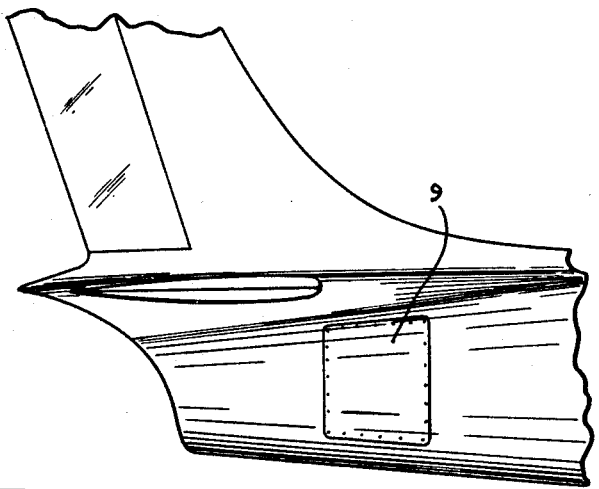

Nov. 8, 1960  H. T. STEVINSON  2,959,671
CRASH POSITION INDICATOR FOR AIRCRAFT
Filed March 26, 1957  7 Sheets-Sheet 2

Inventor
Harry T. Stevinson
by Stevens Davis, Miller & Mosher
his attorneys

Nov. 8, 1960 H. T. STEVINSON 2,959,671
CRASH POSITION INDICATOR FOR AIRCRAFT
Filed March 26, 1957 7 Sheets-Sheet 3

Nov. 8, 1960   H. T. STEVINSON   2,959,671
CRASH POSITION INDICATOR FOR AIRCRAFT
Filed March 26, 1957   7 Sheets-Sheet 4
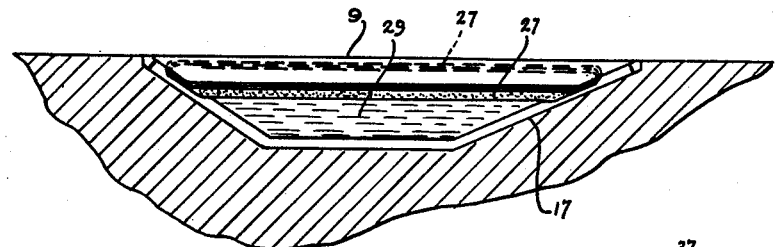
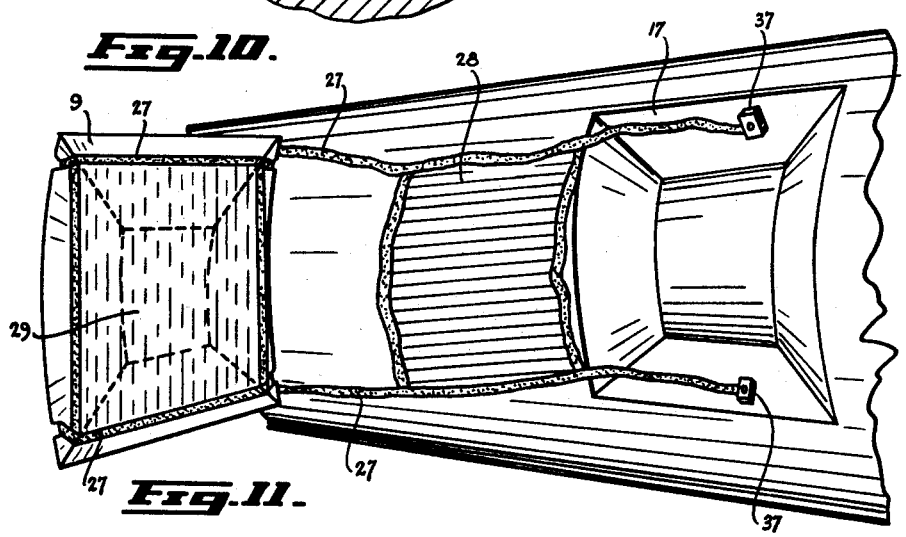
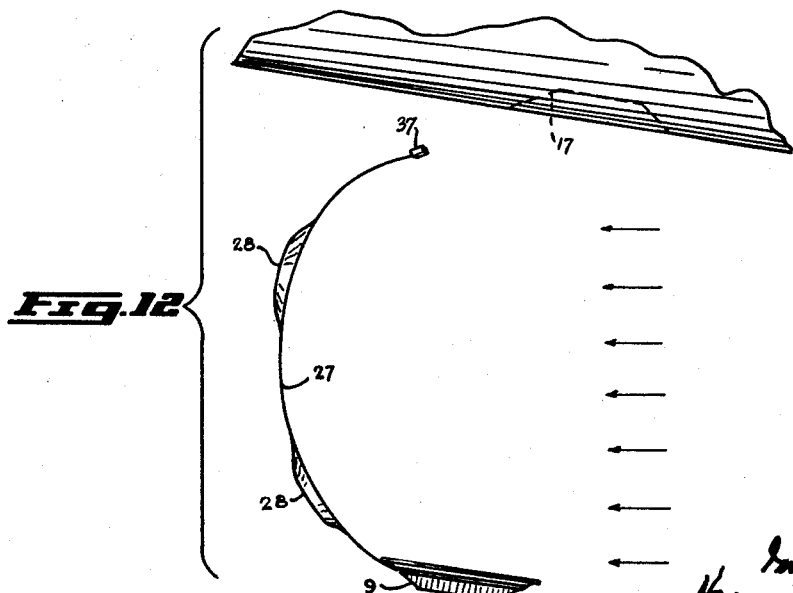

Nov. 8, 1960 H. T. STEVINSON 2,959,671
CRASH POSITION INDICATOR FOR AIRCRAFT
Filed March 26, 1957 7 Sheets-Sheet 5

Nov. 8, 1960   H. T. STEVINSON   2,959,671
CRASH POSITION INDICATOR FOR AIRCRAFT
Filed March 26, 1957   7 Sheets-Sheet 7
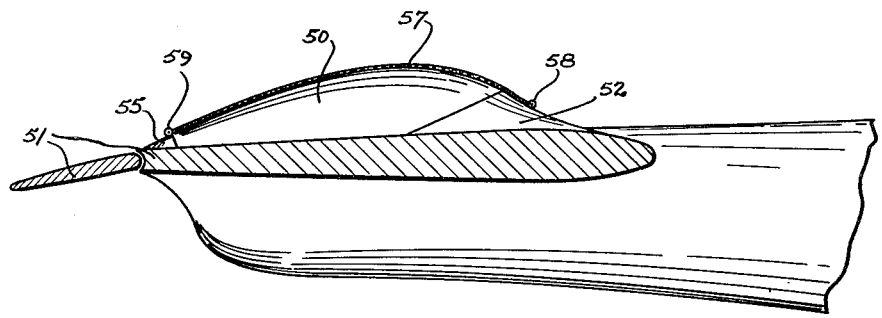
Fig.20.
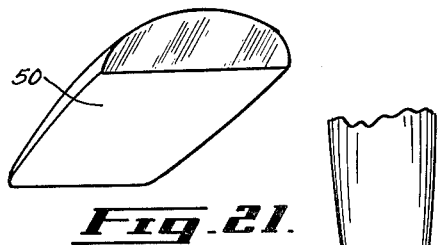
Fig.21.
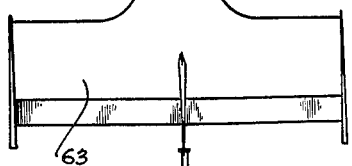
Fig.22.
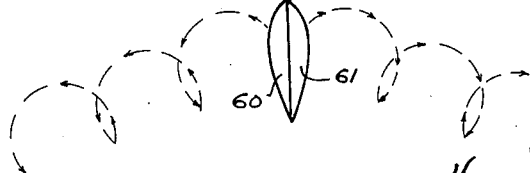

United States Patent Office 2,959,671
Patented Nov. 8, 1960

2,959,671

CRASH POSITION INDICATOR FOR AIRCRAFT

Harry T. Stevinson, Ottawa, Ontario, Canada, assignor to National Research Council, Ottawa, Ontario, Canada, a body corporate of Canada Filed Mar. 26, 1957, Ser. No. 648,680

Claims priority, application Canada Apr. 4, 1956

6 Claims. (Cl. 250—17)

This invention relates to a crash position indicator for use on aircraft.

The problem is to provide means by which an aircraft may be located as quickly as possible after it has crashed. Clearly such a means would increase the chance of any survivors being rescued, but the requirement that the aircraft be quickly located will in no way be reduced by the fact that the aircraft may be entirely incapable of salvage, or that there may be no chance of there being any survivors. This is because it is always necessary to continue the search until the absence of survivors has been established beyond all doubt—a virtual impossibility until the position of the crash is located. In one or two instances survivors of crashes in undeveloped territory have been rescued three or four weeks after the crash, and for this reason it has become established procedure to search for aircraft for at least such a length of time after they have been reported missing. Such searches, often necessarily covering enormous areas of territory, may involve the employment of a large number of other aircraft for a period as long as a month. The expenditure of time and effort is very considerable and financial cost correspondingly high. Furthermore in some instances additional aircraft have been lost while searching.

There is thus a very real need for a simple device that will indicate to searching aircraft the position of a crashed aircraft regardless of the condition of the aircraft. It is essential that the device should operate automatically, so as to be independent of operation by survivors, and it is desirable that the device should be as far as possible immune to damage, even from the most severe impact. Moreover, a single device is required that will operate reliably in any terrain, under all weather conditions and for all anticipated crashing speeds.

If a maximum crash velocity for the aircraft is assumed to be of the order of 1000 miles per hour, the extremely heavy decelerating forces that will be imposed upon any such device will be immediately appreciated since the maximum length in which the device can be decelerated is that of the aircraft itself, or possibly slightly more should the device be towed behind the aircraft.

Various proposals have already been made to provide a device to fulfill this function. Chief among these proposals have been to mount a radio beacon in an elongated metal cylinder and to place this cylinder in a mortar in the tail of the aircraft. The crash is detected by an accelerometer near the nose of the aircraft, the accelerometer being connected electrically to the mortar so as to fire an explosive charge therein on detection of the impact. The mortar is directed so as to project the beacon away from the aircraft, and sometimes somewhat rearwardly thereof to compensate for the forward velocity. The main requirement is to deploy the device a sufficient distance from the crash to escape destruction by fuel explosion or fire, and to avoid the possibility of fire or debris interfering with radio transmission. A parachute is used to facilitate gentle landing of the beacon.

This system has been experimented with and has operated satisfactorily in some cases of low speed crashes of comparatively large aircraft. It has, however, many fundamental and practical limitations which render it unsuited to use with smaller aircraft operating at high speeds. There are two main disadvantages: the thrust is distributed over a small area, namely the end of the cylinder; and the mortar stroke must be short in comparison with the aircraft length because of the weight and structural problems involved, having regard to the explosion pressures set up. Moreover, it is unlikely that the parachute can be deployed in time to check the device in the length of the aircraft, so the system is limited to shallow angle crashes unless the mortar faces backwards. If provision is made for an explosive force strong enough to compensate for the forward velocity of the beacon in a high speed crash, this would be incorrect for a lower speed crash when the beacon would be blown too violently from the fuselage, possibly directly onto a rock surface or cliff face to be destroyed. This presents the difficult problem of matching the muzzle velocity to an unknown aircraft crash velocity.

An additional difficulty lies in the fact that a cylindrical type of structure is not well suited for falling on certain types of terrain, more particularly deep soft snow or muskeg, because its natural tendency is to penetrate too deeply. In one type of beacon previously proposed the device is provided with wrap-around arms which roll the cylinder over onto one side after it has landed so that an automatically extending mast may be properly oriented and the beacon commence transmission. There is an appreciable chance that these arms will become tangled with the parachute or its cords, in spite of the fact that provision is made for releasing the parachute, or will become tangled with tree branches or other vegetation if the aircraft crashes in wooded terrain, thus preventing the correct orientation of the device. Another disadvantage of the prior system is the complicated sequence of operations involved, which makes the device costly and heavy, combined with a real problem in maintaining the device reliable under all aircraft operating conditions. The system involves powerful explosive which are always an added danger and greatly complicate the safety precautions necessary particularly in civilian aircraft. The parachute requires frequent inspection and repacking, and the mortar will have a weight at least comparable with that of the beacon itself in order to withstand the explosion pressure.

The present invention proposes a radio beacon type of crash position indicator which departs radically from such previous design and which is based on the new concept of mounting the indicator in a broad flat asymmetrical casing having a deploying surface that is oriented at an inclination to the direction of travel of the aircraft and which, on release of the indicator at the moment of crashing, acts to provide a drag that will convert the forward motion of the indicator, or at least a substantial part of such forward motion, to transverse motion away from the aircraft. It is important to make the indicator with as high a drag as possible, and one convenient way of accomplishing this object is to form the casing with a large surface area and to present this area flatwise to the airstream as quickly as possible. The term "airstream" is used for convenience to denote the relative motion between the casing and the air, although it will be the casing which is actually moving. As a practical matter a shallow casing of extended area—a shape that will be referred to hereinafter as "generally flat" for convenience of description, notwithstanding the fact that some of the surfaces may be curved—can most conveniently be carried on an aircraft with its major faces generally parallel with the aircraft skin. This will be best appreciated when it is realized that the indicator must be mounted as far to the rear of the aircraft as possible in order to have the greatest available distance in which to decelerate, and there is seldom much available space near the tail of a modern fighter aircraft, especially those types in which a jetpipe extends along the interior of the fuselage.

In its preferred form, therefore, the indicator of the present invention comprises a generally flat casing housing a radio beacon, this casing being mounted in a shallow socket formed in the skin of the aircraft near the tail thereof, with the outer wall of the casing forming a contiguous continuation of the aircraft skin. Extending rearwardly from the leading edge of the casing is an inwardly projecting inclined surface which acts as the deploying surface. The casing may be held in by shear pins or some equivalent arrangement that will rupture under the impact forces consequent upon crashing of the aircraft, or by mechanically operated releasing mechanism. In either instance the casing will slide forwards and outwards bringing its deploying surface into the airstream. Preferably this action will be augmented by pressure from within the socket, conveniently in the form of a spring or springs, although the possibility of a small explosive charge is not ruled out.

As an alternative to mounting in a socket in the aircraft fuselage itself, the indicator may be towed behind the aircraft in a mounting that replaces the socket. The mounting and indicator assembly may conveniently be shaped as an airfoil. In other respects the device will operate as in the former arrangement, the deploying surface being initially shielded from the airstream and being projected thereinto at the moment of impact.

In both cases, as soon as the deploying surface is projected into the airstream, the air pressure on the surface will quickly rotate the indicator to present its broad inner wall to the airstream and the indicator will immediately commence rapid deceleration. The initial pressure on the deploying surface imparts sufficient rotational motion to the indicator to cause it to spin rapidly away from the aircraft and, this effect is enhanced by the cavity formed instantaneously at the moment of release between the opposed, rear surfaces of the indicator and its mounting, such cavity serving to trap a portion of the airstream. The rotational motion imparted to the indicator increases the total drag of the indicator, further decelerating its forward velocity. To ensure continuance of rotation and to avoid the possibility of the indicator travelling edgewise to the airstream and knifing into the ground, the casing is shaped and loaded so as to be unstable in edgewise flight.

Attention is directed to the accompanying drawings which show crash position indicators illustrating the present invention.

In these drawings:

Figure 1 shows an elevation view of a crash position indicator;

Figure 2 shows a side view from the left of Figure 1;

Figure 3 shows a section on the line III—III in Figure 1;

Figure 4 shows a typical manner in which the indicator of Figures 1 to 3 may be mounted adjacent the tail of a fighter aircraft;

Figure 9:
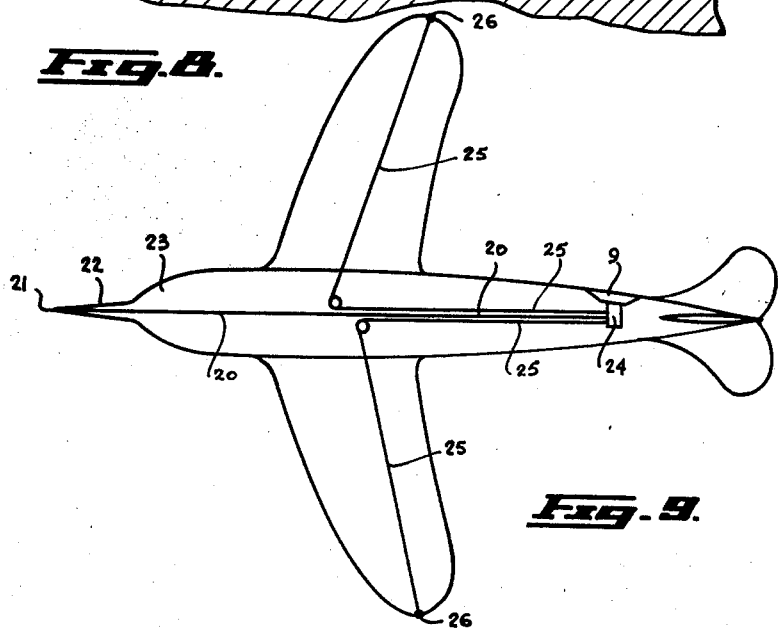
Figure 13:
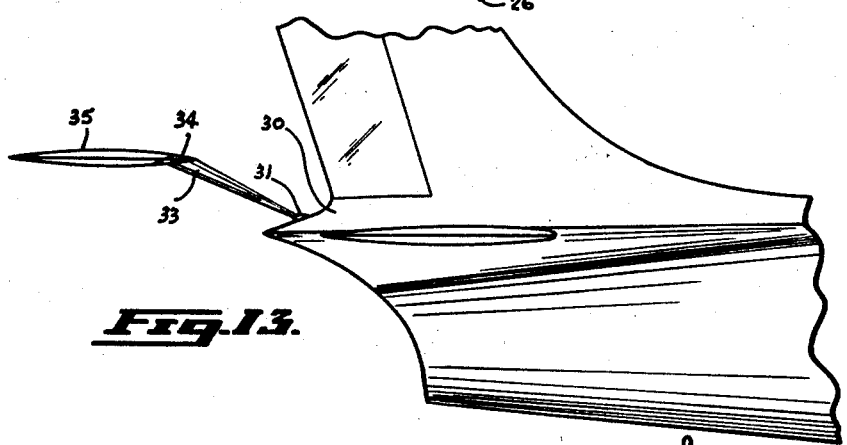
Figure 14:
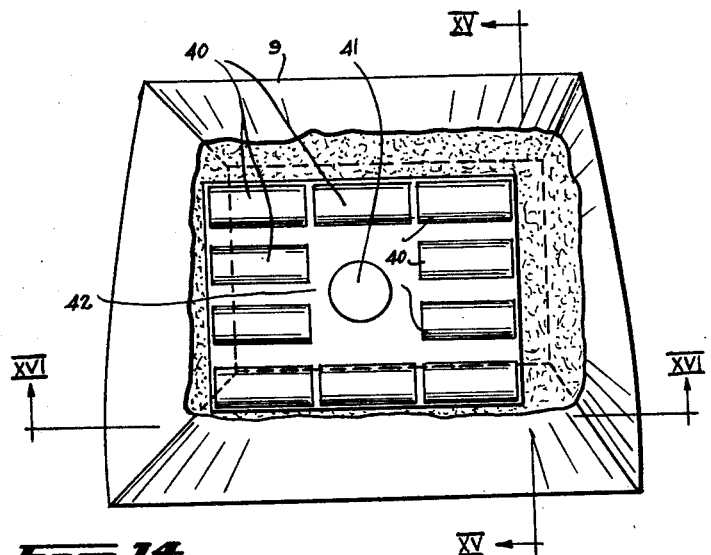
Figure 16:
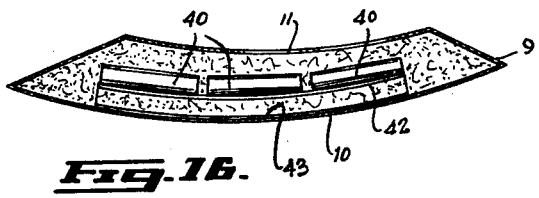
Figure 15:
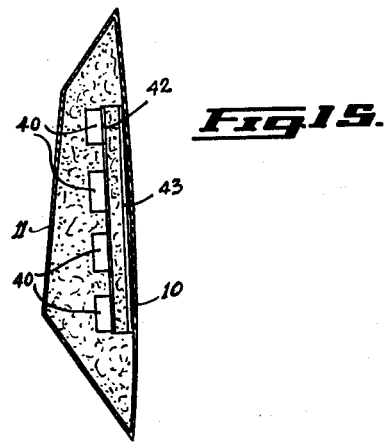
Figure 17:
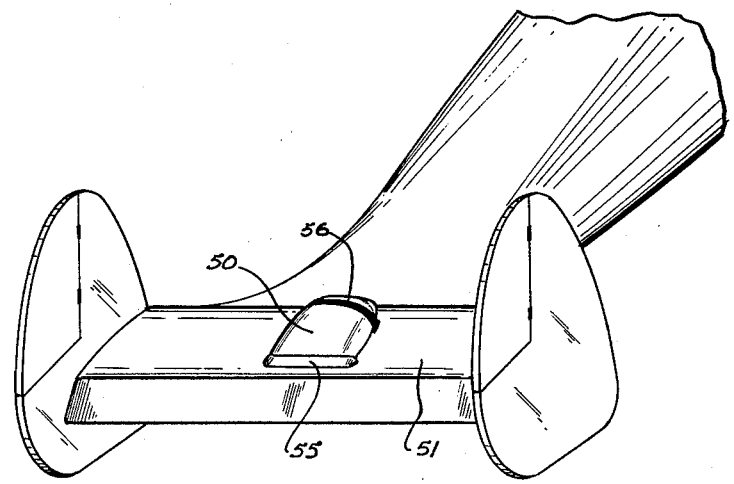
Figure 18:
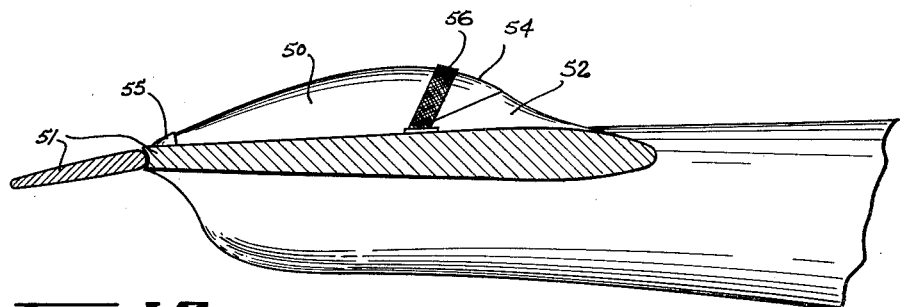
Figure 19:
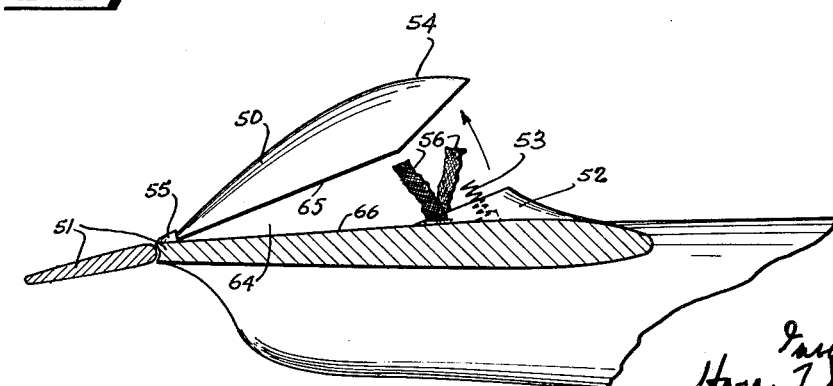

Figure 9 affords a schematic illustration of a manner in which the indicator may be actuated by supplementary detecting means distributed throughout an aircraft;

Figure 10 is a view of an alternative form of indicator mounted in the skin of an aircraft;

Figure 11 is a perspective view demonstrating the manner of operation of the device shown in Figure 10;

Figure 12 is a plan view showing the parts of Figures 10 and 11 at a later stage in their operation;

Figure 13 is an illustration of a further alternative method of mounting a crash position indicator on an aircraft;

Figure 14 is a cut-away front view of a modified crash position indicator having a modified interior arrangement;

Figure 15 is a section on the line XV—XV in Figure 14;

Figure 16 is a section on the line XVI—XVI in Figure 14;

Figure 17 is a rear perspective view of the tail portion of an aircraft showing a further modified crash position indicator in position;

Figure 18 is a section through the tail plane of this aircraft showing such crash position indicator in side elevation;

Figure 19 is a similar view showing the movement away from the aircraft of the crash position indicator at the moment of release;

Figure 20 is a view similar to Figure 18 showing a still further modification;

Figure 21 is a perspective underside view of the crash position indicator shown in Figures 17 to 20, to demonstrate more fully the shape of this device; and Figure 22 is a diagrammatic plan view of a modified form of a towed crash position indicator.

As appears from Figures 1 to 3 showing one embodiment of the invention, the overall shape of the casing 9 of the indicator may be approximately that of a shallow truncated pyramid the base of which is almost a part of a cylinder but more accurately a part of a cone. More exactly the shape shown is that defined between a double walled circular cone and a further cone (not necessarily a circular cone, and in fact in the present case a somewhat asymmetrical pyramidal cone) having its longitudinal axis intersecting that of the first cone generally perpendicularly. The conical outer wall 10, is shaped to replace a portion of the skin of the aircraft at the area in which the indicator is to be mounted, and the exact shape will thus vary with the aircraft design. The manner in which this effect is produced will appear from Figures 4 and 8. This outer wall 10 is generally rectangular in outside periphery and is secured to an inner wall 11 thus serving to define the space in which the radio transmitter is housed. The casing parts are preferably constructed of a light, tough, synthetic material such as Fiberglas (registered trademark) or preferably a more ductile low temperature plastic such as Teflon (registered trademark for polytetrafluoroethylene), and the radio transmitter is mounted centrally in the casing in the manner best seen in Figure 3. The transmitter itself is not shown in detail but is represented by the block 12 mounted between an antenna consisting of a pair of plates 13 extending approximately parallel to the outer wall 10 of the casing. Batteries 14 are imbedded in a suitable mass 15 of foam plastic and then mounted adjacent the plate antennae 13. A large number of batteries will be required to give as long a transmission life as possible under the worst conditions (taking into account the fall off of efficiency of the batteries at low temperatures) and this will be the primary factor determining the size of the casing. After the transmitter parts have been mounted in the casing 9 formed by the walls 10 and 11, all remaining empty spaces are filled with a pourable foam plastic of a type that will subsequently set. This foam plastic will completely surround the parts in the casing and serve to absorb mechanical energy on impact. At the same time it will assist in providing a high strength to weight ratio to withstand aerodynamic and landing stresses and in keeping low the specific gravity of the device as a whole which should be much less than unity so that the device will float high in water. Suitable foam plastics are now available having adequate mechanical properties, as well as being low loss dielectrics so as not to absorb appreciable radio energy.

Examples of such foam plastics are those sold under the registered trademarks Lockfoam, Eccofoam, Isofoam, Polyfoam or Laminac 4231 which is a mixture of one of the unsaturated alkydtriallylcyanurate copolymeric resins and a foaming agent such as tolylene diisocyanate. Foam plastics are mixed with a catalyst. A suitable catalyst for use with Laminac 4231 is di-tert-butyl peroxide. The Laminac 4231 foaming process involves a comparatively lengthy heat treatment to cure the plastic, but some of the other foaming plastics available, notably Eccofoam type FP which has been found very satisfactory, will foam and set at room temperature. In many cases the reaction proceeds very quickly as soon as the catalyst is added and pouring must be completed in about one minute. The preferred technique in constructing the crash position indicator illustrated in the accompanying drawings is first to embed each main component of the payload (transmitter and batteries) in foam plastic, then to form a sub-assembly of such components with the antenna plates, and finally to mount such sub-assembly between the inner and outer walls of the casing, positioned by suitable foam plastic spacers. Both in the formation of the separate components and in the final assembly a conventional technique is employed. The parts are mounted firmly in a mould and a measured quantity of the liquid foam plastic is poured in at a suitable point of access. The plastic expands up to about 30 times its original volume, forces itself into all interstices and expels the air from a number of small holes left for this purpose. The mould parts are held firmly together to prevent the foam plastic deforming the walls of the casing, the density of the final product being determined by the quantity introduced. After the plastic has set the casing is removed from the mould and the access points sealed up with a suitable bonding material.

It is calculated that the device illustrated in the drawings will withstand impact with a hard surface when travelling at a speed of the order of 100 ft. per second without collapse or damage severe enough to prevent transmission. If the indicator lands flatwise on a hard surface its load is distributed over such a large area that the pressure is not great, while if it lands edgewise a large volume of crushable material is available to absorb the shock. A switch 16 is mounted behind one of the inclined surfaces of the inner wall 11 of the device for actuation upon deployment thereof, and is connected to the transmitter by suitable wiring (not shown).

Figure 5:
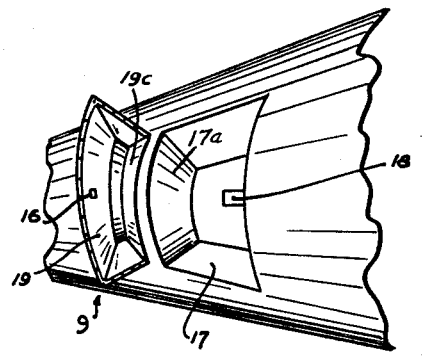
Figure 5 shows a view of this indicator at the moment of its release from such a position as shown in Figure 4.
Figure 6:
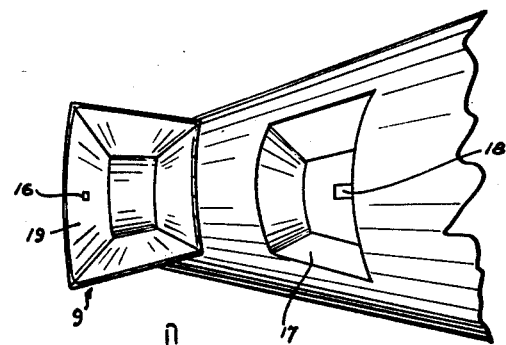
Figure 6 shows a view similar to Figure 5 with the parts in the positions they will occupy a very short time later.
Figure 7:
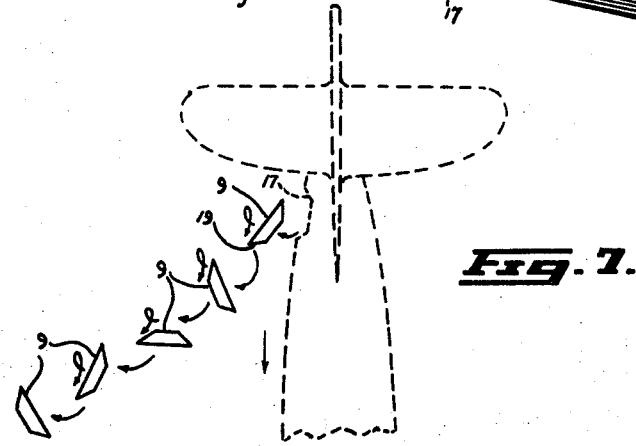
Figure 7 is a plan view further demonstrating this action.

This crash position indicator is intended to be supported in the fuselage of an aircraft in a mounting which in this case takes the form of a socket 17 of shape complementary to the inner shape of the device itself, i.e. the shape of the wall 11. This arrangement appears from Figures 4 to 8. In Figure 4 the device is shown mounted near the rear and beneath the tail-plane assembly of a fighter aircraft. In this aircraft, and in other types of aircraft in which a jet pipe is mounted within the main fuselage, there is comparatively little depth available for the mounting of a crash position indicator, and this is one reason for its comparatively shallow nature. The other reason is the desire for a large area to present to the airstream, as has already been explained. The socket 17 may conveniently be constructed of metal and will preferably be provided with a comparatively strong leaf spring 18 (Figure 8) mounted beneath the leading sloping surface 19 (the principal deploying surface) of the inner wall 11. When the device is housed as in Figures 4 and 8, this spring is compressed. On release the spring 18 gives the deploying surface 19 a sharp initial outward movement into the airstream flowing along the skin of the aircraft. The manner of deployment will be evident from the foregoing general remarks and the drawings, especially Figure 7 which shows the indicator in a number of successive positions relative to the ground.

It is conceivable that the direction of the airstream at the moment of impact may not be parallel to the longitudinal axis of the aircraft, since the aircraft may be falling flatwise or spinning, and to provide for this possibility the inner wall 11 is made pyramidal in form thus providing additional flat surfaces 19a and 19b at the top and bottom of the device in its position on the aircraft. These surfaces 19a and 19b may thus be considered as supplementary deploying surfaces each available to deploy and spin the indicator either alone or in conjunction with the principal deploying surface 19. The shape of the inner wall 11 also provides a rearward inclined surface 19c which similarly will be available to perform the function of a deploying surface should the direction of the airstream be reversed from normal, say as the result of an aerial break-up of the aircraft.

It should also be explained that the force of the spring 18 (which constitutes separating means effective upon release of the indicator to initiate rapid separation of the leading edge of the indicator from its mounting and rapid rotation of the indicator towards a position flatwise with respect to the direction of the airstream) is assisted as far as urging the indicator away from the mounting is concerned by a portion of the air stream which becomes momentarily trapped in the cavity formed adjacent the rear of the indicator between the two opposed and generally co-extensive surfaces constituted by the rear surface 17a of mounting socket 17 and the rear surface 19c of the indicator. This cavity is formed only momentarily as the leading edge of the indicator separates from the mounting, that is in the short interval leading up to the instant shown in Figure 5.

The manner in which the indicator is secured in its socket may vary to suit individual requirements, but will normally fall into one of two main categories:

(a) Shear pins or the like that can be relied upon to rupture with the shock of impact and thus allow the device due to its forward motion to slide forwardly and outwardly of its socket until its sloped leading inner surface is caught by the airstream (as before, the direction of shock may not necessarily be along the longitudinal axis of the aircraft and not necessarily parallel to the airstream, but one or other of the supplementary deploying surfaces 19a, 19b and 19c will be available to co-operate with the complementary surface of the socket to provide a pair of surfaces that can readily slide on one another and allow the indicator to move quickly out into the airstream); or (b) A release mechanism, connected to crash detection means such as an accelerometer at the nose of the aircraft or in the wing tips, and/or operable by the pilot, connected for automatic operation with his ejection seat mechanism, or arranged for operation by a mechanism that detects the imminence of a crash, such as a proximity fuse type of device which is highly directional in a forward direction and is sensitive to the rate of approach of a barrier and only operable when that rate exceeds a minimum value greater than that ever experienced in normal ground handling conditions, e.g. 30 miles per hour.

In either case the shear pins or release mechanism will be set with a shock threshold below which they will be inoperative. This will avoid release of the indicator as a result of the shocks experienced in normal flight under adverse whether conditions, and in landing and take-off.

Figure 8:
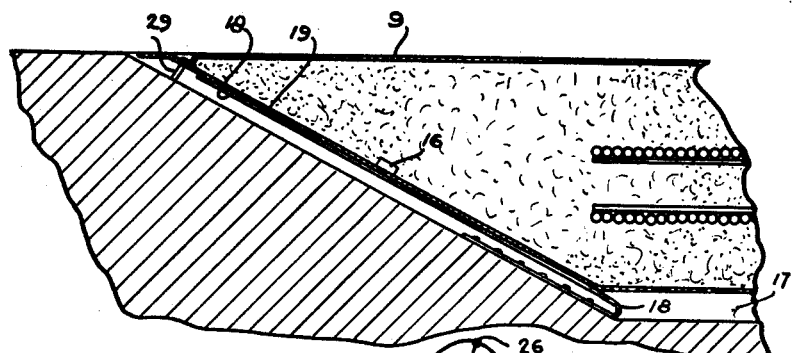
Figure 8 shows a cut-away view of a portion of the indicator in position such as in Figure 4, on an enlarged scale and illustrating some operating parts mounted in the aircraft.

Figure 8 shows a simple system in which a number of shear pins 29 are used to secure the casing 9, although it will be appreciated that any other means of releasably holding the device in its socket may be employed. For example, a release mechanism may be operated by suitable means for detecting structural deformation of the aircraft. Figure 9 provides diagrammatic illustration of such a system in which a wire 20 is stretched from a point of attachment 21 at the forward end of a nose boom 22 of an aircraft 23 to extend rearwardly to a release mechanism 24. Similar stretched wires 25 may extend to points of attachment 26 in the wing tips. The release mechanism 24 will be arranged to be insensitive to minor variations of tension in the wire resulting from temperature changes and normal stretching, but to be immediately responsive to any extreme change of tension, whether it be relaxation or an increase of the tension. In order to ensure very rapid transmission of signal (of the order of one millisecond for high speed crashes), the tensile stress in the wire 20 should be as high as possible, for instance 200,000 pounds per square inch. Alternatively an accelerometer in the aircraft nose may be connected electrically to the release mechanism.

It is of paramount importance to release the device as quickly as possible immediately following the impact, because under worst conditions it will have a distance equal to only the length of the aircraft in which to decelerate. The present structure is particularly well adapted for deceleration in a short length due to its comparatively high drag co-efficient. It is anticipated that a drag co-efficient approaching 2.0 can be achieved with the present design, with a terminal velocity as low as about 20 ft. per second.

An important feature of the device, which contributes to its high drag and thus to the success of the device as a crash position indicator, is the fact that it is unstable for edgewise travel through the air. This instability is also valuable in ensuring that on release the device quickly turns to present a large projected area to the airstream and does not subsequently remain for any appreciable time in edgewise flight.

As mentioned above it is desirable to deploy the device with a sideways component of velocity as large as possible, in order to provide a reasonable expectation that it will always manage to travel away fom the aircraft sufficiently to remove it from danger from fuel explosion or fire. The shape and manner of deployment of the present indicator leads to very satisfactory behaviour in this respect, because large outward lift is generated early during deployment, and rotation is in the correct sense to cause the device to travel away from the wreck while falling.

The absence of edgewise stability in flight is also important in consideration of the behaviour of the indicator on landing on various different types of terrain.

Should it land edgewise in deep snow (the chance of this happening is small since the device will be spinning), it will immediately turn onto its inner or outer wall because of its rotational momentum and because it will similarly be unstable for edgewise travel through snow. The large area of the device is thus quickly employed to prevent deep penetration that might prevent radiation of radio signals (up to 1 or 2 feet is quite acceptable depending on the water content). The low density which the device has due to its low weight materials is of considerable assistance in reducing penetration when landing on soft earth, snow or muskeg. In water the device will float high and its water-tight skin and foam filling prevent interruption of radio transmission.

Should a crash occur in densely wooded forest or jungle country, where the tree tops may be anything up to 250 ft. above the ground, it is desirable that the crash position indicator should never fall completely to the ground, but should become entangled with the trees and remain at an elevated position, this being more satisfactory for efficient radiation of radio signals as avoiding attenuation due to a thick covering of jungle growth. It will immediately be apparent that the low density and general flat shape of the present indicator renders it more likely to become entangled in tree tops than the cylindrical type of beacon hitherto employed.

Figures 10, 11 and 12 illustrate a modified form of indicator designed to provide further advantage in this respect. Here the casing 9 is mounted in a socket 17 in the fuselage of an aircraft in a like manner as before, but it is provided with a pair of parallel tapes 27, each of which is secured at one end to the casing 9, is wound around the casing, and finally is loosely connected at its other end to a fixed part of the socket 17. These tapes 27 which will extend parallel to one another may conveniently be connected together at intervals by pieces of coloured cloth 28. To avoid stress concentrations one or more additional tapes may be arranged parallel to and between the tapes 27. When the indicator is released and commences to travel outwardly from the skin of the aircraft (Figure 11), it will tend to unwind itself from the surrounding tapes 27, thereby contributing to its rotational acceleration and increasing the drag. The pieces of cloth 28 joining the two tapes 27 will provide additional drag on the device both before and after the tapes 27 have been torn free from the aircraft. (See also Figure 12.) The ends of the tapes 27 will preferably have weights 37 secured to them to maintain some tension in the tapes 27 after they have been detached from the aircraft. The tapes 27 and pieces of cloth 28 attached to the indicator will appreciably increase its chance of becoming entangled in tree tops, a function in which they will be assisted by the weights 37 which will tend to wrap the tapes around tree branches in the manner of a Bolas. The cloth will be coloured to assist in visual identification of the exact position of the crash once the general area has been discovered from the radio signals.

The flat configuration of the casing of the device enables the mounting therein of a substantially non-directional plate-type antenna that will provide a lobe pattern that will permit detection of the beacon signals without the need for deployment of the antenna from the casing, and regardless of the position in which the device may finally come to rest. In particular, the device will set up a satisfactory lobe pattern while lying flat on either face (a position it is most likely to occupy) or edgewise (should it become entangled in vegetation or fail to turn to a flat position in snow or soft earth). This is a very significant advantage of the present invention over the prior mentioned type of cylindrical beacon casing. Moreover, the mounting of the indicator is such that the transmitter can radiate while the casing is still in its socket in the aircraft fuselage.

In the case of an aircraft structure in which it is found impractical to mount a crash position indicator in the fuselage without danger of interference with control surfaces, it is possible to mount the device on a semi-swivelling tail boom as illustrated in Figure 13. This figure shows the tail of an aircraft, to the fin 30 of which, there is rigidly secured a bracket 31 providing pivotal connection for a rigid tube 33 which supports at its far end either rigidly or pivotally a mounting 34 on which a releasable crash position indicator 35, of the general type previously described, is secured. Alternatively, the tube 33 can be secured to any other convenient point on the aircraft not likely to interfere with the safe operation of the control surfaces or to provide hazard on landing or take-off. The assembly consisting of the mounting 34 and indicator 35 may conveniently be shaped like an airfoil and may be arranged to be self-supporting in the airstream or even to provide additional lift to the tail of the aircraft. As before, release may take place by the shock of impact or by suitable release mechanism connected to the aircraft through the tube 33. In order to avoid possible flutter or oscillation at high speeds consideration should be given to the following factors:

(a) Providing damping at the joints at one or both ends of the tube 33, (b) Providing mass balancing by the addition of auxiliary masses supported ahead of the pivots, and (c) Avoiding as far as possible locating the casing in regions of high turbulence (for instance, the casing may be offset to one side of the centreline of the aircraft as well as being arranged above the horizontal control surfaces, in which case tilting of the casing about the longitudinal axis of the aircraft would normally be advisable).

Figures 14 to 16 illustrate an alternative internal construction of crash position indicator. This modified layout is designed to concentrate the principal items contributing to the weight of the indicator along the central plane of the indicator approximately equidistant from the inner and outer walls of the casing, thus providing more protection for the transmitter and batteries in the shallow space available. To this purpose ten assemblies of batteries 40 are arranged in approximately the central plane of the casing 9 substantially equidistant from the outer wall 10 and the inner wall 11. These assemblies of batteries 40 are grouped around a transmitter 41 and all these parts are secured to one plate 42 of the antenna. The other plate 43 of the antenna is arranged adjacent the outer wall 10 and the space between the two plates 42 and 43 is filled with the same pourable foam plastic as fills the remainder of the casing 9. The design of Figures 14 to 16 requires the foam plastic between the antenna plates to be able to restore itself to its original dimensions at least slowly after deformation. In this design the foam plastic between the antenna plates acts as a shock absorber as well as an insulator.

A still further modified form of crash position indicator is illustrated in Figures 17 to 21. This device consists, as before, of a casing 50 in which a radio transmitter will be mounted in a suitable foam plastic or honey comb material. The inner structure of this form of the device is not basically different from that already described. The modification lies in the shape of casing 50 and its manner of mounting on the aircraft. It will be noted that the aircraft skin is not recessed to receive the casing 50, which thus appears as a streamlined bulge on the aircraft, the casing 50 being somewhat more streamlined than has been necessary in the embodiments previously described, by reason of the absence of a socket in the aircraft skin.

A convenient position for mounting this device on the tail plane 51 of an aircraft is shown in Figures 17 to 20. Preferably a rudimentary socket 52 is formed at the forward edge of the casing 50 as a convenient manner for housing a plurality of coil ejector springs 53. These springs function in exactly the same manner as the spring 18 previously referred to in that they assist in deployment of the casing 50 from the aircraft. An advantage of the present structure is that the airfoil-like upper surface 54 of the casing 50 results in a greater initial lift at the moment of deployment. Moreover, of course, the need for a socket recessed into the skin of the aircraft is avoided. As further means to assist initiation of rotation of the device at the moment of deployment, its trailing edge is inserted in a shallow socket 55. This socket 55 initially tends to aid counter-clockwise rotation of the device at the moment of release, as clearly shown in Figure 19, and further assists in positively ensuring the formation of an instantaneous cavity 64 between opposed surfaces 65 and 66 on the indicator device and mounting respectively. This cavity 64 acts as in the previous embodiment to trap a portion of the airstream and assist separation of the indicator device from its mounting.

The retaining means shown in Figures 17 to 19 consists of a thin steel strap 56 extending transversely across the casing 50 from suitable side attachment points, at least one of which will conveniently be a small winch for tightening the strap.

When release is required, the strap will be cut by a wire, such as one of the wires illustrated in Figure 9. Details of a preferred form of release mechanism constitute the subject of a separate application, these details not being germane to the present invention which is concerned with the structure and shape of the crash position indicator, its manner of mounting in relation to the other parts of the aircraft, and its manner of deployment.

Figure 20 shows an alternative method of securing the device by means of a similar strap 57 extending from a forward fixing 58 on the socket 52 to a rearward fixing 59 on the socket 55.

Figure 22 illustrates a further alternative construction employable with a towed type of device. In this case, instead of providing a socket for a single crash position indicator, a pair of similar crash position indicators 60 and 61 are placed back to back and mounted on the end of a towing bar 62 extending rearwardly from the aircraft 63. The airfoil section of each of the devices 60 and 61 will result in a strong lift on each of them acting in a direction away from the other, so that, as soon as they are released, they will spin away from one another as indicated by the broken line arrows. The advantage of this arrangement is, of course, the increased likelihood that at least one of the devices will be deployed to an extent sufficient to remove it from damage or destruction resulting from fire, explosion, or impact with the terrain.

Certain practical design considerations that must be taken into account in the construction of a crash position indicator according to the present invention, will now be discussed.

Theory shows that the distance the aircraft will move while the indicator rotates through a fixed angle is substantially independent of aircraft velocity and will be less than that given by Equation 1 which allows for aerodynamic forces only and does not take into account the beneficial effects of the spring and the deflecting action caused by sliding of the casing out of the socket.

$$S = V_0 t = \sqrt{\frac{8\rho_1 dl\theta}{3\rho}} \quad (1)$$

where $S$ = distance the aircraft will travel at the velocity $V_0$ in the time $t$
$\rho_1$ = density of the indicator
$d$ = average thickness of indicator
$l$ = average length of indicator in the airstream direction
$\theta$ = instantaneous angle of deployment of the indicator
$\rho$ = density of air
$V_0$ = aircraft velocity
$t$ = time elapsed while indicator turns through angle $\theta$ This shows that to get rapid rotation the indicator, density, length and depth should be small and the air density large. Better performance at low altitude is thus expected as is the case with parachutes.

Equation 1 is a simple approximate form of a more involved one which can also predict the effect of the springs.

Once the indicator has rotated out of the socket it must slow down to a speed where it can safely land on any surface. The required slowing down may be as great as 15 or 20 to 1 in sever cases.

This action is given nearly enough by the equation $$\epsilon = \frac{V_0}{V_1} = e^{\left(\frac{g}{V_t^2} S_1\right)} \quad (2)$$

where $V_0$ = aircraft velocity
$V_1$ = indicator velocity at impact with the ground
$\epsilon$ = the slow down ratio
$e$ = 2.718
$g$ = the acceleration due to gravity
$V_t$ = terminal velocity of the indicator $$= \sqrt{\frac{W}{1/2 \rho A C_D}}$$

$W$ = indicator weight
$\rho$ = air density
$S_1$ = the distance the indicator travels from socket to ground
$A$ = maximum projected area of indicator
$C_D$ = the drag coefficient, so that
$AC_D$ = effective area of indicator This equation is also a simplified form of a more exact one and is accurate for cases were $V_1$ is much greater than $V_t$ which more or less is the present case where $V_t$ should be of the order of 20 ft./second. $V_t$ is slightly smaller when the indicator is rotating.

The design of the indicator should be such that it slows down in air to a velocity where it can hit deep soft snow and penetrate only a foot or so. This condition is obtained if the indicator area is controlled by the following equation:

$$A = \frac{-B \pm \sqrt{B^2 - 4C}}{2} \quad (3)$$

where $$B = \frac{-2d_2 W}{P_0 Z}$$

$$C = \frac{-2d_2 W^2}{\rho C_D g P_0 Z^2} = \frac{BW}{\rho C_D g Z}$$

where here
$d_2$=original depth of snow
$P_0$=a characteristic strength for the snow in question (700 lb./ft.² for soft snow)
$Z$=depth of penetration into snow This equation shows that a design having an area of the order of one square foot per pound of indicator should simultaneously act as a parachute and snowshoe. This equation gives a value of Z that is larger than the practical value, because snow density and air compression are neglected.

The shock absorber function is obtained by the following process. If the indicator lands on a rock, ice or other hard object at a velocity $V_1$ the length of stroke of the shock absorber which must be provided is given by $$L = \frac{V_1^2}{2gGE} \quad (4)$$

where
$L$=minimum length of shock absorber
$V_1$=velocity of indicator at impact with surface
$G$=number of $g$'s deceleration payload can stand $$= \frac{a}{g}$$

$a$=deceleration of the indicator
$g$=acceleration of gravity=32.2 ft./sec.² at the earth's surface
$E$=length efficiency of the shock absorber, i.e. the ratio of the length of an ideal shock absorber to the length of the practical shock absorber absorbing the same total energy A length L must be allowed all around the indicator, as it may hit in any orientation, and this length will vary with G for different directions of impact.

The strength of the shock absorber required is given by $$P_3 = Gw \quad (5)$$

where
$P_3$=pressure maintained during stroke of shock absorber
$w$=payload distribution over surface of shock absorber (pounds of payload per square inch of shock absorber)

Using these formulae (4 and 5) it is found that an inch or two of strong but light foam plastic on both sides of the battery and considerably more around the edges allows the indicator to hit a hard surface at nearly 100 feet per second if the battery is spread in one thin layer of about 0.026 pound per square inch load distribution using foam of strength about 30 pounds per square inch. This allows several pounds of batteries to be carried and an indicator life of several days. The shock on the payload will be limited to around 1100 $g$'s while the foam is crushing and bringing the payload to rest. This is about the same order of shock as that imparted by aerodynamic forces when this design is deployed at about 1,000 miles per hour. The above equations thus also form a means of predicting the maximum speed that any such design can (a) be deployed at
    (b) hit a hard surface at
    (c) hit a snow surface at Because of the very low density of the indicator, penetration into swamp will be negligible compared to snow.

I claim:

1. At the rear of an aircraft an assembly comprising a shock-resistant crash position indicator and a mounting therefor, said indicator comprising a generally flat casing, radio transmitting equipment mounted in said casing and a mass of light, tough, energy-absorbent material filling the interior of said casing and totally surrounding said radio transmitting equipment, said mounting including means for releasably supporting said indicator generally edgewise to the direction of the airstream, said assembly including separating means effective upon release of said supporting means to initiate rapid separation of the leading edge of said indicator from said mounting and rapid rotation of said indicator towards a position flatwise with respect to said airstream direction, said separating means including a pair of opposed, substantially co-extensive surfaces formed respectively on said casing and said mounting to co-operate with each other as the leading edge of said indicator separates from said mounting to form a cavity for momentarily trapping a portion of said airstream adjacent the rear of said indicator and hence assisting the forces urging said indicator away from said mounting, said indicator being so constructed and arranged as to be unstable in edgewise flight after release from said mounting.

2. The structure of claim 1, wherein said casing further includes a deploying surface normally shielded from the airstream by said mounting and extending rearwardly from the leading edge of said casing at an inclination to the longitudinal axis of the aircraft when the indicator is in position in said mounting.

3. The structure of claim 1, wherein said mounting comprises a shallow socket in the outer skin of the aircraft, said indicator being so constructed and arranged as to seat in said socket with the outer wall of its casing forming a streamlined, substantially contiguous continuation of the aircraft skin surrounding said socket.

4. The structure of claim 1, wherein said mounting includes a generally flat surface of the outer skin of the aircraft, said mounting surface being generally flush with the outer skin of the aircraft surrounding said mounting, said casing being shaped to have an undersurface conforming to said mounting surface and a streamlined, smoothly outwardly curved, outer surface projecting into the airstream beyond said surrounding outer aircraft skin.

5. The structure of claim 4, wherein said casing is of airfoil shape whereby on release of said indicator to experience an aerodynamic lift urging it away from said mounting.

6. The structure of claim 1, including an antenna for said radio transmitting equipment, said antenna comprising a pair of spaced-apart, superposed plates each mounted within said casing in a plane generally parallel to the main plane of said casing, said casing being substantially transparent to radio-frequency electromagnetic radiation and being devoid of projecting members.

References Cited in the file of this patent

UNITED STATES PATENTS

| 2,470,783 | Mead | May 24, 1949 |
| 2,473,050 | Camp | June 14, 1949 |
| 2,552,969 | Holman | May 15, 1951 |
| 2,777,655 | Graham | Jan. 15, 1957 |
| 2,857,510 | Haggerty et al. | Oct. 21, 1958 |

OTHER REFERENCES

Aviation Week, April 3, 1950, "Navy's New Exit Cabin," page 28.